Dec. 20, 1955 C. ZELNICK 2,727,701

TAPE MEASURE

Filed June 27, 1952

INVENTOR.
Charles Zelnick.
BY
Fearman & Fearman.
ATTORNEYS

United States Patent Office 2,727,701

Patented Dec. 20, 1955

2,727,701

TAPE MEASURE

Charles Zelnick, Saginaw, Mich., assignor to The Lufkin Rule Company, Saginaw, Mich.

Application June 27, 1952, Serial No. 295,898

7 Claims. (Cl. 242—84.9)

This invention relates to tape measures of the push-pull type, and more particularly to a new and improved casing and means therein for resisting the creeping tendencies of the tape.

In tape measures of this type, wherein the tape is restored to its casing by pushing, and not by spring action, a light balancing spring is employed within the casing to attain a smooth pushing or pulling action. This spring must be exactly balanced with relation to the particular tape with which it is to be employed or an undesirable creeping of the tape will result at various points within its range of operation. Since it is impractical to balance the strength of each coiled spring with the physical characteristics of its particular tape, it is highly desirable to provide some effective and inexpensive means independent of the spring for insuring that the tape will not creep.

One of the prime objects of my invention is to design a tape casing wherein resilient means are provided for frictionally engaging or gripping the edges of the tape to resist or restrain any tendency of the tape to creep in either direction at any point within its range of operation.

A further object of the invention is to design a tape casing wherein creep-restraining means are provided which do not appreciably increase the effort required to pull out or push in the tape, or interfere with, or affect the smoothness of operation thereof, or in any manner mar the finish or graduations thereon.

Another object of the invention is to provide a resilient means within the casing for engaging or gripping the edges of the tape and preventing the coiled tape from working out of the casing when fully wound.

A still further object of the invention is to provide a tape casing wherein the means for frictionally resisting the tendency of the tape to creep is floatingly mounted in the casing and free to adjust within limited vertical confines, while at the same time being restricted from longitudinal creeping with the tape.

A further object of the invention is to design a casing and a creep-resisting member therein which is durable and interfitted within the casing so that it cannot become disengaged during use, but which is easily removable when desired and can be readily replaced when necessary.

A still further object of the invention is to design a casing and creep-resisting means therein which can be simply and economically manufactured and assembled.

To the accomplishment of the foregoing and related ends, said invention then consists in the means hereinafter described and particularly pointed out in the claims and annexed drawing, the following description setting forth in detail certain means and one mode of carrying out the invention, such disclosed means and mode illustrating, however, but one of the various ways in which the principle of the invention may be used.

Figure 1:
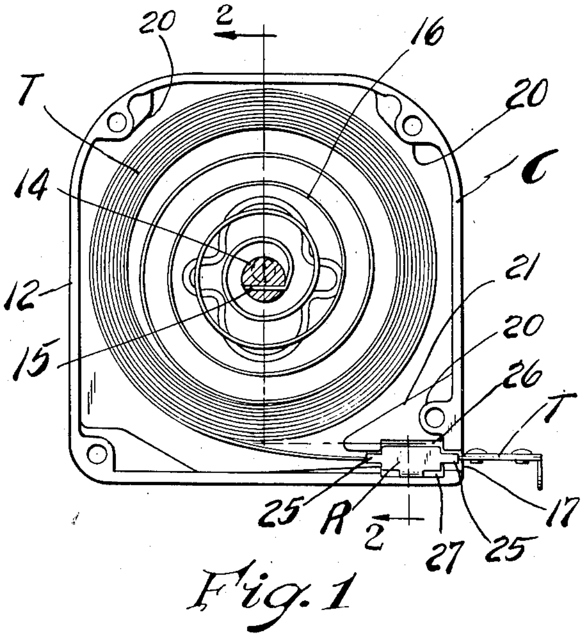
Fig. 1 is a side elevational view of my tape measure with one of the casing sections removed, the creep-resisting member being mounted in position therein.
Figure 2:
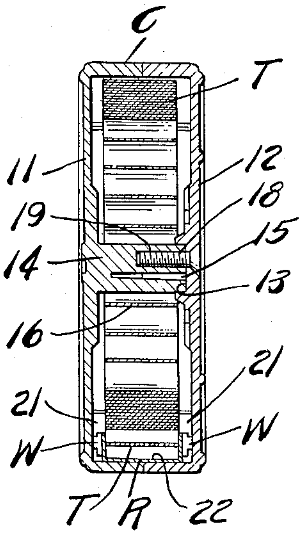
Fig. 2 is a transverse sectional view through the assembled casing taken on a line comparable to the line 2—2 of Fig. 1.
Figure 3:
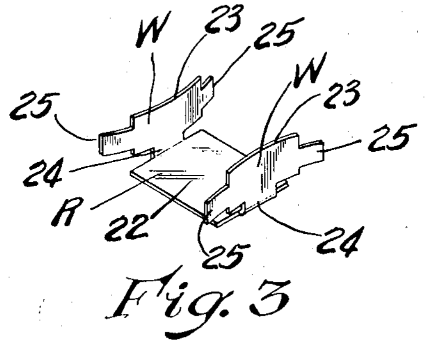
Fig. 3 is a perspective plan view of the creep-resisting member only.
Figure 4:
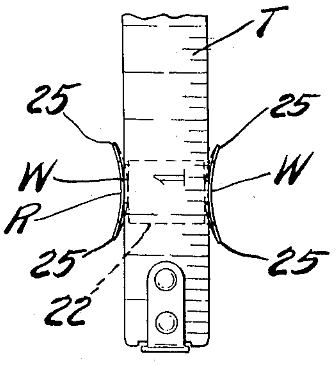
Fig. 4 is a plan view of the creep-resisting member in frictional engagement with the edges of the tape, the casing being omitted from the view for clarity.

Referring now more particularly to the accompanying drawing wherein I have shown the preferred embodiment of my invention, a letter C generally indicates my tape casing which includes individual case sections or shells 11 and 12, the section 12 having a socket 13 formed in the inner central portion thereof for receiving the projecting post 14 of the section 11. The post 14 is slotted as at 15 for anchoring the coiled spring 16 as usual, and the coiled tape T is shown mounted on the end of the spring 16 with its free end extending out the tape opening 17 of the casing in the conventional manner. A screw 18, mounted in the section 12, is received in a threaded opening 19 provided in the post 14 to secure the case sections in assembled relation. Corresponding tape guide projections 20 are provided in each casing section 11 and 12 and the front wall of each case is formed with a substantially triangular, inwardly projecting portion 21 extending horizontally just above the tape opening 17.

Adapted to be positioned rearwardly adjacent the tape entrance 17 within the casing C, is my substantially U-shaped creep-restraining or resisting spring member R formed of a relatively flexible metal or other resilient material of thin gauge. The spring members R which can be economically stamped out in large quantities, include a base portion 22 and wings or arms W extending upwardly therefrom, the wings W being formed with arcuate portions 23 to frictionally engage the edges of the tape T and restrain it from creeping. The distance between the wings W is, of course, slightly less than the width of the tape and the portions of the wings W which join the base 22 are reduced to form neck portions 24 so that sufficient flexibility or resiliency may be developed in the arcuate portions 23. In order that there may be no creeping, the spring member R must be prevented from longitudinal movement within the casing, and shoulders 25 are therefore provided on the wing W to intimately interfit within the marginal walls of the transverse groove 26 formed by channeling the bottoms of the projections 21.

Further, a transverse groove 27 is formed in the bottom wall of each case section and serves as a seat for the base 22 and the grooves 26 and 27 operate to hold the creep-resisting member R against longitudinal movement with the tape. The grooves 26 and 27 are of sufficient depth so that the creep-restraining member R is free to move vertically within the limits thereof and adjust to the position of the tape which changes as the coil is wound or unwound.

The spring member R can be formed to fit tapes of all sizes and can be employed with both planar and non-planar tape rules. The resistance imparted by the creep-restraining member R is sufficient only to keep the tape from creeping and it in no manner interferes with pulling the tape out of or pushing it back into its casing.

It will thus be apparent that I have designed a very novel and effective means for frictionally resisting the tendency of the tape to creep, which is simple and can be produced in large quantities at low cost.

What I claim is:

1. In a push-pull tape measure, a casing having a tape opening therein, a U-shaped resilient member mounted in said casing rearwardly adjacent said opening, a flexible tape rule coiled in said casing with its free end extending longitudinally through said U-shaped member out said opening, said U-shaped member having arcuate arm portions extending in a longitudinal plane and joined to the base portion of the U-member by substantially reduced necks, said arcuate arm portions frictionally engaging only the edges of said tape rule to prevent it from creeping, said resilient member being restrained by said casing from any longitudinal movement with said tape.

2. In a tape measure, a tape casing comprising abutting case sections, each case section being formed with a slotted front wall to form a transverse tape entrance when the case sections are in assembled relation, a flexible tape rule coiled in said casing with its free end extending out said entrance, the case section being formed with inwardly extending projecting portions adjacent said tape entrance, said projecting portions being correspondingly channeled to form a transverse groove when said case sections are in assembled relation, the bottom walls of said case sections being channeled to form a transverse seat when said case sections are in abutting relation, a resilient member disposed in said seat and having upwardly bent, transversely spaced wings in engagement with only the edges of said tape to prevent creeping thereof, the upper portion of said wings being reduced and of a width to be snugly accommodated in said transverse groove to prevent longitudinal shifting of said member.

3. The combination defined in claim 2 in which the resilient member is of such vertical dimension as to be vertically movable within the confines of said seat and groove and of such longitudinal dimension as to be restrained from longitudinal movement by said seat and groove.

4. The combination as defined in claim 2 in which the wings include a neck portion and a longitudinally extending arcuate-shaped tape edge engaging portion.

5. In a tape measure, a tape casing comprising abutting, recessed case sections with spaced-apart walls, said tape casing having a transverse tape entrance formed therein and being formed with a portion substantially spanning the spaced walls of said case sections rearwardly adjacent said tape entrance, a flexible tape rule coiled in said casing with its free end extending past said portion out said tape entrance, the said portion being channeled to form a transverse groove and the casing opposite said portion on the opposite side of said tape from said portion being channeled to form a transverse seat, a resilient U-shaped member with the body thereof snugly accommodated in said seat and the arms thereof spaced apart a distance less than the width of said tape and extending from said body to resiliently grip the edges of said tape, said arms being formed with tape-engaging, arcuate portions extending in substantially the longitudinal plane of the tape joined to said body by reduced neck portions, said tape-engaging, arcuate portions having a shouldered portion of a width to closely fit in said transverse groove to aid in restraining longitudinal movement of said resilient member, the depths of the said transverse groove and seat being such that the resilient member has a limited play therein in the one direction permitting its movement with said tape.

6. In a tape measure, a tape casing comprising abutting, recessed case sections with spaced-apart walls, said tape casing having a transverse tape entrance formed therein and being formed with portions substantially spanning the spaced walls of said case sections rearwardly adjacent said tape entrance, a flexible tape rule coiled in said casing with its free end extending past said portions out said tape entrance, the said portion being channeled to form a transverse groove, a resilient U-shaped member, the arms thereof spaced apart a distance less than the width of said tape and extending from said body to resiliently grip the edges of said tape, said arms being formed with tape-engaging arcuate portions extending in substantially the longitudinal plane of the tape, said tape-engaging arcuate portions having a shouldered portion of a width to closely fit in said transverse groove to restrain longitudinal movement of said resilient member.

7. The combination defined in claim 6 in which a transverse seat is formed in said casing on the opposite side of said tape from said groove of a width to closely accommodate said body portion of the resilient member, said grooves being of sufficient depth relative to the length of said arms to permit limited movement of the member with the tape in the one direction without permitting the member to become disengaged from said grooves.

References Cited in the file of this patent

UNITED STATES PATENTS

| | | |
|---|---|---|
| 421,133 | Grierson | Feb. 11, 1890 |
| 2,055,281 | Dulczewski | Sept. 22, 1936 |
| 2,132,202 | Carlson | Oct. 4, 1938 |
| 2,410,420 | Bennett | Nov. 5, 1946 |
| 2,462,261 | Goldberg | Feb. 22, 1949 |
| 2,469,674 | Witchger | May 10, 1949 |
| 2,503,440 | Johanningmeier | Apr. 11, 1950 |